United States Patent
Kincel

(10) Patent No.: US 10,634,533 B2
(45) Date of Patent: Apr. 28, 2020

(54) FLUID FLOW MEASURING DEVICE AND ASSOCIATED METHOD

(71) Applicant: FT Technologies (UK) Ltd, Sunbury-on-Thames (GB)

(72) Inventor: Michael Kincel, Sunbury-on-Thames (GB)

(73) Assignee: FT Technologies (UK) LTD, Sunbury-on-Thames (GB)

( * ) Notice: Subject to any disclaimer, the term of this patent is extended or adjusted under 35 U.S.C. 154(b) by 0 days.

(21) Appl. No.: 16/153,590

(22) Filed: Oct. 5, 2018

(65) Prior Publication Data

US 2019/0107420 A1    Apr. 11, 2019

(30) Foreign Application Priority Data

Oct. 5, 2017 (GB) .................................. 1716277.7

(51) Int. Cl.
*G01F 1/66* (2006.01)
*G01N 29/06* (2006.01)
(Continued)

(52) U.S. Cl.
CPC .............. *G01F 1/667* (2013.01); *G01F 1/66* (2013.01); *G01N 29/032* (2013.01); *G01N 29/036* (2013.01); *G01F 1/668* (2013.01)

(58) Field of Classification Search
CPC . G01F 1/667; G01F 1/668; G01F 1/66; G01F 1/663; G01N 29/036; G01N 29/024; G01N 29/222; G01N 29/42
(Continued)

(56) References Cited

U.S. PATENT DOCUMENTS 4,607,239 A * 8/1986 Ballato ................... H03B 5/32
                                                     331/158
4,608,506 A   8/1986 Tanuma
(Continued)

FOREIGN PATENT DOCUMENTS

GB    2140160    11/1984
JP    S58211667    12/1983

OTHER PUBLICATIONS

Great Britain Patent Application No. GB1716277.7, Search Report dated Jan. 22, 2018.
(Continued)

*Primary Examiner* — Lisa M Caputo
*Assistant Examiner* — Rose M Miller
(74) *Attorney, Agent, or Firm* — Sheppard, Mullin, Richter & Hampton LLP

(57) ABSTRACT

A device includes an acoustic resonance cavity through which fluid can flow and which can support an acoustic standing wave. The frequency of a supported wave varies with fluid temperature over an operating temperature range, thereby defining an operating frequency range. The device includes two acoustic transducers for generating and detecting the acoustic standing wave. Each transducer couples to an electric network including an inductive component and a capacitive component. The inductive and capacitive components and the connected transducer define a resonance behavior in which signals in a first part of the operating frequency range in which the transducer has a first sensitivity are amplified relative to signals in a second part of the operating frequency range in which the transducer has a higher second sensitivity. Amplitude variations through the resonance cavity, acoustic transducers and electric networks are less than amplitude variations through only the resonance cavity and acoustic transducers.

9 Claims, 10 Drawing Sheets

(51) Int. Cl.
  *G01N 29/032*  (2006.01)
  *G01N 29/036*  (2006.01)

(58) Field of Classification Search
  USPC .................................. 73/579, 592, 630, 629
  See application file for complete search history.

(56) References Cited

U.S. PATENT DOCUMENTS

| | | | |
|---|---|---|---|
| 5,877,416 A | 3/1999 | Kapartis | |
| 5,987,992 A | 11/1999 | Watanabe | |
| 8,923,794 B2 | 12/2014 | Aigner | |
| 2012/0271568 A1 | 10/2012 | Wilson | |
| 2013/0109332 A1* | 5/2013 | Aigner | H03H 9/02102 455/90.2 |
| 2017/0140085 A1* | 5/2017 | McHugh | G06F 17/5045 |
| 2018/0078969 A1* | 3/2018 | Kent | H04B 11/00 |

OTHER PUBLICATIONS

An, Jianfei et al., "Design of a Broadband Electrical Impedance Matching Network for Piezoelectric Ultrasound Transducers Based on a Genetic Algorithm," Sensors, vol. 14, No. 4, pp. 6828-6843, Apr. 2014.

International Application No. PCT/GB2018/052862, International Search Report and Written Opinion dated Jan. 29, 2019.

Pro-Wave Electronics Corp., "Application Note—AP050913: Equivalent Circuit of Ultrasonic Transducers," Aug. 30, 2005 [retrieved online at http://www.prowave.com.tw/pdf/an050913.pdf on Jan. 7, 2019].

* cited by examiner

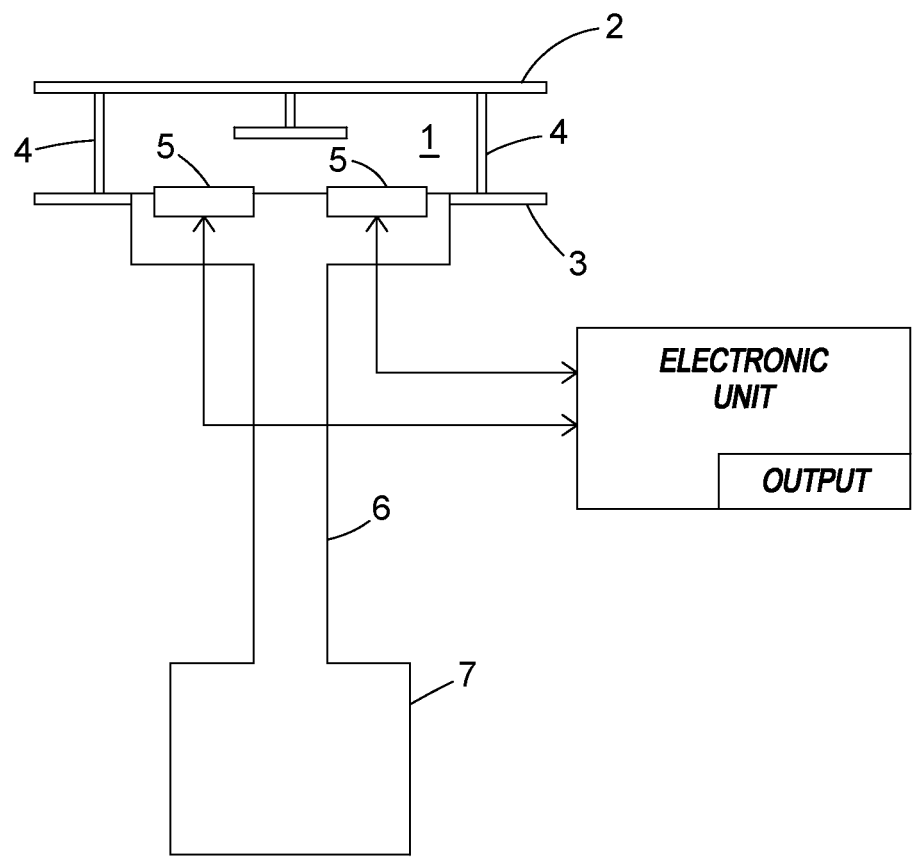
FIG. 1
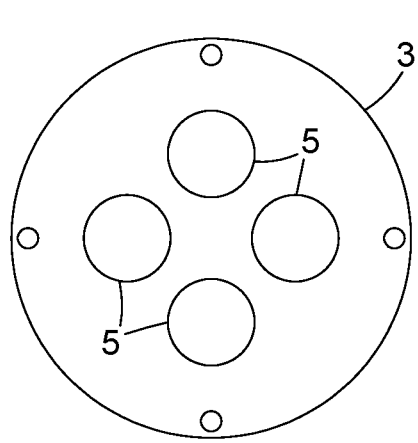 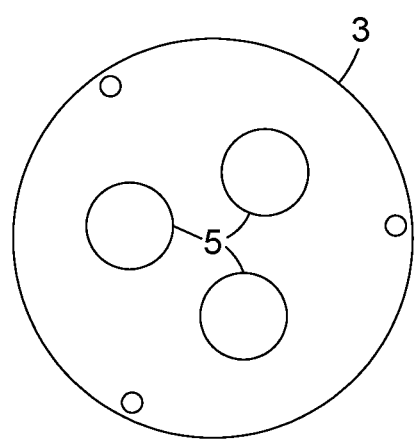
FIG. 2A  FIG. 2B

FLUID FLOW MEASURING DEVICE AND ASSOCIATED METHOD

CROSS-REFERENCE TO RELATED APPLICATIONS

This application claims the benefit of United Kingdom Patent Application No. GB1716277.7, filed on Oct. 5, 2017 and entitled "Fluid Flow Measuring Device And Associated Method," which is hereby incorporated by reference herein.

FIELD OF THE INVENTION

The present disclosure relates to a device for measuring the flow speed of fluid, in particular to a device of the type used in the measurement of the speed and direction of movement of air, water and other fluids.

BACKGROUND

Devices for measuring the speed of fluid flow find widespread use, not least in meteorology. Such use exposes the measurement devices to a wide range of environmental conditions that can affect the measurement accuracy achieved by the device. There is a desire to provide a fluid flow measurement device that provides fluid flow speed measurements with improved accuracy despite such changes in the environmental conditions in which the device operates.

BRIEF DESCRIPTION OF THE DRAWINGS

Arrangements of the present invention will be understood and appreciated more fully from the following detailed description, made by way of example only and taken in conjunction with drawings, in which:

FIG. 1 shows a known fluid flow speed measurement device;

FIG. 2A shows a known arrangement of four transducers within a fluid flow speed measurement device;

FIG. 2B shows a known arrangement of three transducers within a fluid flow speed measurement device;

DETAILED DESCRIPTION

Figure 3:
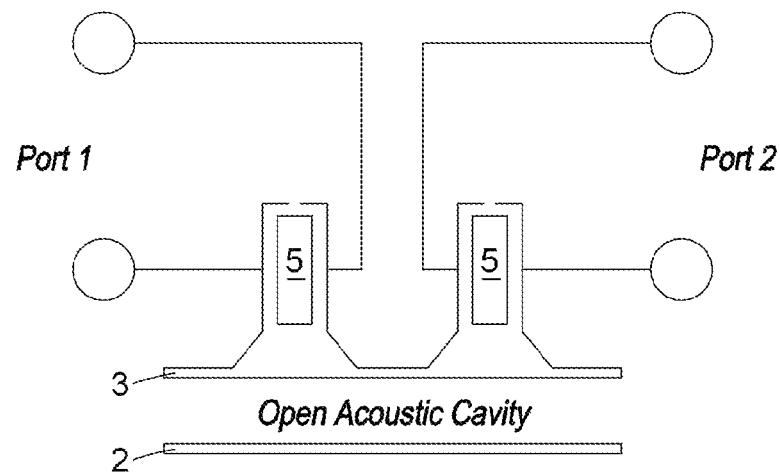
FIG. 3 shows a high level electrical representation of two transducers of a known fluid flow speed measurement device.

According to an embodiment there is provided a device comprising an acoustic resonance cavity through which a fluid can flow. The fluid has a temperature within an operating temperature range. The cavity is capable of supporting an acoustic standing wave, wherein the frequency of the supported standing wave varies with the temperature of the fluid over the operating temperature range, thereby defining an operating frequency range. The device further comprises at least two acoustic transducers, respectively for generating and detecting the acoustic standing wave, wherein a frequency response of said transducers varies over said frequency range. Connected to each transducer is an electric network comprising at least one inductive and at least one capacitive component. The at least one inductive and at least one capacitive component define, together with the connected transducer, a resonance behaviour in which signals in a part of the operating frequency range in which the transducer has a first sensitivity are preferentially amplified relative to signals in a part of the operating frequency range in which the transducer has a second sensitivity. The first sensitivity is lower than the second sensitivity. This causes variations in the amplitude of signals propagated through the resonance cavity, the two acoustic transducers and the connected electric networks across the operating range to be less than variations in amplitude of a signal propagated through only the resonance cavity and the two acoustic transducers.

The variations in amplitude of the signals propagated through the resonance cavity, the two acoustic transducers and the connected electric networks across the operating range are preferably less than 18 dB, more preferably less than 10 dB, even more preferably less than 5 dB and most preferable 3 dB or less. In one embodiment this is achieved even though the variations in the sensitivities of the transducers themselves is greater than 30 dB or even as large or larger than 50 dB.

The electric network may comprise a further reactive component selected from an inductor and a capacitor.

The at least one inductive, the at least one capacitive component and the further reactive component can be arranged in a T-network wherein reactive components of the same type are provided along two horizontal parts of the network or in a π-network wherein reactive components of the same type are provided along two vertical parts of the network.

A capacitor with a capacitance that varies with the temperature of the capacitor can be provided in parallel or in series with a port capacitance of the transducer. The temperature dependent capacitor can have a temperature dependence that causes the combination the temperature dependent capacitor with the transducer to have a reduced or substantially eliminated temperature dependence over the operating temperature range than the transducer alone.

The device may further comprise one or more damping means configured to reduce signal amplification at one or more resonance frequencies of the electric compensation network.

According to another embodiment there is provided a method of measuring fluid flow speed comprising providing a device that comprises an acoustic resonance cavity through which a fluid can flow. The fluid has a temperature within an operating temperature range. The cavity is capable of supporting an acoustic standing wave, wherein the frequency of the supported standing wave varies with the temperature of the fluid over the operating temperature range, thereby defining an operating frequency range. The device further comprises at least two acoustic transducers, respectively for generating and detecting the acoustic standing wave. A frequency response of said transducers varies over said frequency range. Connected to each transducer is an electric network comprising at least one inductive and at least one capacitive component. The at least one inductive and at least one capacitive component define, together with the connected transducer, a resonance behaviour in which signals in a part of the operating frequency range in which the transducer has a first sensitivity are preferentially amplified relative to signals in a in a part of the operating frequency range in which the transducer has a second sensitivity. The first sensitivity is lower than the second sensitivity. This causes variations in the amplitude of signals propagated through the resonance cavity, the two acoustic transducers and the connected electric networks across the operating range to be lower than variations in amplitude of a signal propagated through only the resonance cavity and the two acoustic transducers. The method comprises injecting a signal into an input port of the electric network coupled to one of the transducers at a frequency at which a standing wave is created in the cavity, receiving the injected signal at an output port of the other one of the transducers after the signal has propagated through the two electric networks, the two transducers and the cavity, comparing the injected signal with the received signal to determine a first time delay and/or phase shift experienced during propagation of the signal, repeating the injecting and receiving steps after swapping the electric networks and transducers respectively used for transmission and reception, comparing the injected signal with the received signal to determine a second time delay and/or phase shift experienced during propagation of the signal and determining a flow speed of fluid in the cavity based on determined first and second time delays and/or phase shifts.

The fluid flow speed measurement device may be a device for measuring the flow speed of air. Such devices are known as anemometers.

FIG. 1 illustrates a fluid flow speed measurement device known from, for example, U.S. Pat. No. 5,877,416. The device comprises an acoustic resonant cavity 1 formed between an upper reflector 2 and a lower reflector 3. The pair of reflectors is shown in FIGS. 1, 2A and 2B as circular plates of equal size but other shapes and unequal sizes may be used instead. The pair of reflectors 2 and 3 are held together by spacers 4. In this arrangement the spacers 4 are four rods but other configurations are possible. The illustrated anemometer is maintained on support rod 6 on a housing 7.

The acoustic resonant cavity 1 operates to support a standing acoustic wave in a direction perpendicular to the direction of air flow, i.e. vertically as shown in FIG. 1, and to support travelling waves in the direction(s) along the air flow, i.e. horizontally as shown in FIG. 1. The resonant frequency to support the standing wave is dependent on the frequency of the acoustic signal, the speed of sound, and the separation between the reflectors 2 and 3.

Inside the acoustic resonant cavity 1, acoustic waves are generated by an electro-acoustic transducers 5 and, following multiple reflection of the waves at the reflectors 2 and 3, received by a number of further electro-acoustic transducers 5. The arrangement of FIG. 2A shows four electro-acoustic transducers 5 in total, of which at any given point in time one is used for transmission and up to three can be used for reception of the acoustic wave. FIG. 2B shows three electro-acoustic transducers 5 in total, of which at any given point in time one is used for transmission and up to two can be used for reception of the acoustic wave. An arrangement that only comprises two electro-acoustic transducers can also be envisaged. The transducers 5 can be of any known type such as piezoelectric, inductive, or electrostatic and operate to convert electrical signals into acoustic signals and vice-versa.

In operation any one of the transducers 5 receives an electrical signal generated by the electronic unit shown in FIG. 1 and excites a proportional acoustic signal. By action of the acoustic resonant cavity 1, the acoustic signal is impressed on the other transducers 5, which accept the acoustic signal and generate proportional electrical signals. The electrical signals are, in turn, fed back to the electronic unit for processing.

In propagating from one transducer A to another transducer B the acoustic signal and its derivative electric signal experience a time delay (and equivalent phase shift) which is related to the speed of sound in the medium and the net distance between the transmitting A and receiving B transducers. In still air, an identical time delay is measured when the direction of signal transmission is reversed i.e. from transducer B to A since (a) the distance travelled by the signal and (b) the sound velocity remain the same whether the signal is transmitted from A to B or vice versa.

If the air moves, on the other hand, say from A to B by some speed v, it proportionally increases the net speed of sound in the direction A to B; conversely it proportionally reduces the speed of sound in the direction B to A. Consequently the electronic unit which measures the time delay, or equivalently the phase shift, detects a difference in time delay (and phase shift) when reversing the direction of the signal.

The magnitude of the time delay, and resulting phase shift, is related to the speed of the air along the adjoining line between the pair of transducers. Using a second pair whose adjoining line lies in some other direction the velocity in a second direction can be found. By grouping two of the transducers 5 shown in FIG. 2A and FIG. 2B at a time to form pairs such measurements can be performed.

It will be appreciated that the space between the two resonators 2 and 3 supports an acoustic standing wave. The frequency of the standing wave depends on a number of factors, including the dimensions of the resonant cavity as well as the speed of sound within the resonant cavity. The speed of sound in turn is affected by environmental conditions, not least the temperature of the air within the resonant cavity. For a given measurement the transmitting transducer 5 is excited to emit an acoustic wave at a particular frequency at which the acoustic standing wave is created in the acoustic resonator. A change in the temperature within the acoustic resonator will bring about a change in the speed of sound within the resonator. When this happens the frequency at which the transmitting transducer 5 emits the acoustic wave is no longer the frequency at which the acoustic resonator supports the standing acoustic wave. A temperature change consequently leads to a change in the intensity of the signal received at the receiving transducers 5 as well as a change in signal phase. In operation, the electronic unit senses any change in the speed of sound due to environmental factors and changes the operating frequency of the transmitting transducer 5 to ensure that the acoustic resonant cavity 1 stays in tune.

In one arrangement the transducers 5 used in the anemometer shown in FIGS. 1, 2A and/or 2B are piezoelectric transducers. The properties of the materials forming such actuators change with temperature. This change causes an associated change in the electric properties of the actuator. It was found that the changes in the electric properties include a change in transmit sound pressure level (SPL) and/or receive sensitivity of the transducers 5. This in turn can lead to a reduction in the intensity of the signal generated by the transducer 5.

Fluid flow speed measurement devices such as the one shown in FIG. 1 may be operated in harsh environments, including at sub-zero temperatures. To prevent formation of ice on the reflectors 2 and 3 it may therefore be necessary to heat the fluid flow speed measurement device. This inevitably means that the temperature of the air within the resonant cavity 1 differs from the temperature of the transducers 5. The inventors of the present invention have investigated the effect changes in either and both of the temperature of the transducers and the temperature of the air within the resonant cavity of the fluid flow speed measurement devices has on the transmit SPL and/or receive sensitivity of the transducers 5.

FIG. 3 shows a high level electrical representation of two transducers of a known fluid flow speed measurement device. Two transducers 5 are provided in acoustic connection with the acoustic cavity formed in the space between the reflectors 2 and 3 to allow them to emit an acoustic wave to and receive an acoustic wave from the open acoustic cavity shown in FIG. 3.

The transducers 5 are respectively electrically connected to respective transmit/receive electronics channels at Ports 1 and 2.

Figure 4:
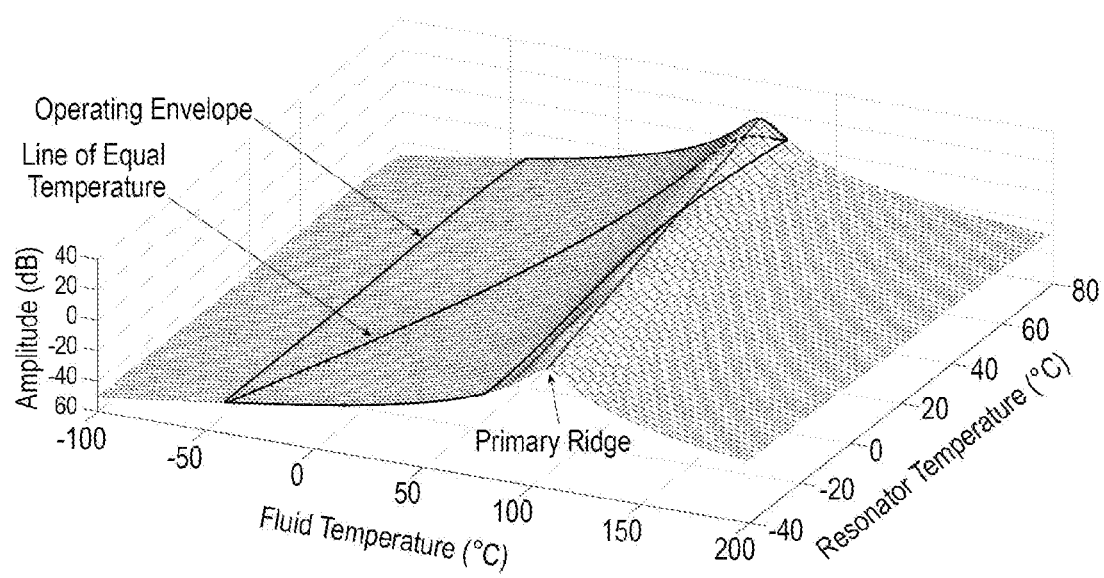
FIG. 4 shows the results of a computer simulation of the temperature dependence of the amplitude of a signal propagated between the two ports of a fluid flow speed measurement device.

FIG. 4 shows the results of a computer simulation of the temperature dependence of the amplitude of a signal propagated between the two ports of a fluid flow speed measurement device. The LTSpice VXII package was used to create all simulations results presented herein. The electric properties of the transducers 5 were simulated in the manner set out in Application Note—AP050913 of Pro-Wave Electronics Group, wherein the electric properties of the transducer for which the matching circuitry was to be optimised were measured at a large number of different temperatures within the desired temperature operating range to provide a complete set of the electrical properties of the transducer over the operating range.

It will be appreciated that the simulations used the resonance frequency at which the device operates as a variable instead of the fluid temperature. The fluid temperature T can, however, be mapped to the resonance frequency required to support a standing wave within the resonant cavity using:

$$T = 273.15 \cdot \left( \left( \frac{l \cdot f}{331.3} \right)^2 - 1 \right) \tag{1}$$

wherein l is the spacing between the reflectors 2 and 3. For the simulations results presented here the cavity height l was 10 mm.

To generate the data shown in FIG. 4 (and all other simulation results discussed further below) the temperature of the simulated transducer as well as the temperature of air simulated to be present in the resonant cavity was varied. To accommodate the variation in air temperature the resonant frequency of the acoustic resonator was changed so that despite the change in air temperature, a standing wave is still created in the resonant cavity.

As is the case for any device, the fluid flow speed measurement device has an intended temperature operating range. The envelope surrounding the operating range of the device simulated to create the data shown in FIG. 4 is indicated in FIG. 4. Changes in signal amplitude within this envelope can affect the overall sensitivity and accuracy of the device. For applications of the fluid flow speed measuring device in meteorology a temperature range for both of the fluid temperature as well as the resonator temperature of between −40° Celsius and +80° Celsius is used.

Also highlighted using a dashed line is the line of equal temperature, that is the line at which the temperature of the transducer is the same as the temperature of the air within the resonant cavity. It will be appreciated that, many devices, in particular those that are not heated, operate under temperature conditions on or close to this line, although the ability for a device to operate at any point within the operating envelope is desirable.

The topology of the surface shown in FIG. 4 is created by two effects. Acoustic resonators are high Q-devices with a correspondingly narrow band in which sensitivity is maximised. As discussed above, the device shown in FIG. 1 is required to support a standing wave between reflectors 2 and 3. The wavelength of this wave changes with the temperature of the fluid between the two resonators. To optimise performance of the device the acoustic resonators need to be operated at or close to the frequency that, for the current air temperature, produces a standing wave between reflectors 2 and 3. This frequency may, however, be outside of the optimum operating frequency range of the acoustic resonator. This cause the large variation in the amplitude of a signal propagated between the two ports depending on fluid temperature seen in FIG. 4.

The properties of the acoustic resonator itself change with resonator temperature as discussed above. These changes in resonator properties cause the variations in the amplitude of signal propagated between the device's ports with varying resonator temperature.

Methods of compensating for the temperature sensitive nature of pressure sensitive transducers are known. To the knowledge of the inventors, however, such measures have only concentrated on compensating for changes in sensitivity of acoustic resonators. Such known methods have considered the change in sensitivity of the acoustic resonator over a range of resonator temperatures.

Comparing the dependence in transmission amplitude on both resonator temperature as well as fluid temperature in FIG. 4, it become apparent that considerable changes in the transmission amplitude with changing fluid temperature have to be expected throughout the operating envelope shown in FIG. 4.

Compensating for temperature dependent changes in the transmitted signal amplitude corresponds to a "flattening" of the surface indicating the transmitted signal amplitude inside of the operating envelope shown in FIG. 4. Whilst such a "flattening" is desirable it is at the same time also desirable to keep overall transmitted signal amplitude to a maximum to avoid undue signal loss and maintain the high sensitivity of the device shown in FIG. 1.

Considering the topology of the 2D transfer function shown in FIG. 4, it is clear that the system (as shown schematically in FIG. 3) is particularly efficient in transmitting energy between the two ports shown in FIG. 3 along the single ridge shown in FIG. 4. It is emphasised that an acoustic standing wave is generated for all operating conditions simulated to generate the data illustrated in FIG. 4 so that the changes in amplitude of the propagated signal are not caused by acoustic phenomena but instead by the limited bandwidth associated with the high Q-value of the acoustic resonator.

Figure 5:
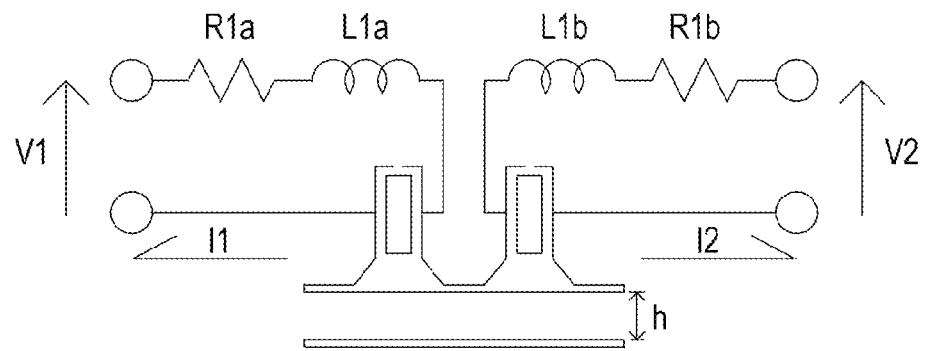
FIG. 5 shows an electrical representation of a way of connecting two transducers to input output ports.

The inventors of the present invention have realised that it is possible to increase the bandwidth over which a system such as the one shown in FIG. 3 transmits without undue attenuation can be modified by modifying the resonant behaviour of the network seen at the ports. FIG. 5 illustrates a higher order network used for simulating the transfer characteristics shown in FIG. 6.

In addition to the acoustic resonator shown in FIG. 3 the circuits shown in FIG. 5 also include inductors and damping resistors. As can be seen from FIG. 6, a second ridge, along which the amplitude of the transmitted signal is maximised, is introduced by the additional inductor. At the same time the location and orientation of the primary ridge that is also evident in FIG. 4 are modified by the presence of the inductor. The second ridge is caused by the resonant behaviour of the circuit formed by the inductor and the capacitance of the acoustic resonator. The acoustic resonator is less able to detect acoustic signals at frequencies associated with the second ridge than at frequencies associated with the first ridge as shown in FIG. 4. However, the resonant behaviour of the combination of the circuit formed by the inductor and the capacitance of the acoustic resonator amplifies signals detected at frequencies associated with the second ridge, thereby compensating for the lack of sensitivity of the acoustic resonator along the second ridge.

The presence of the inductor therefore decreases overall signal attenuation at low fluid temperatures but increases signal attenuation at fluid temperatures close to the higher fluid temperature end of the operating envelope. The net effect achieved is that the amount of variation in the signal propagated between the ports is decreased. However, as can be seen, the signal propagated through the system still suffers considerable attenuation at low fluid and resonator temperatures.

Figure 6:
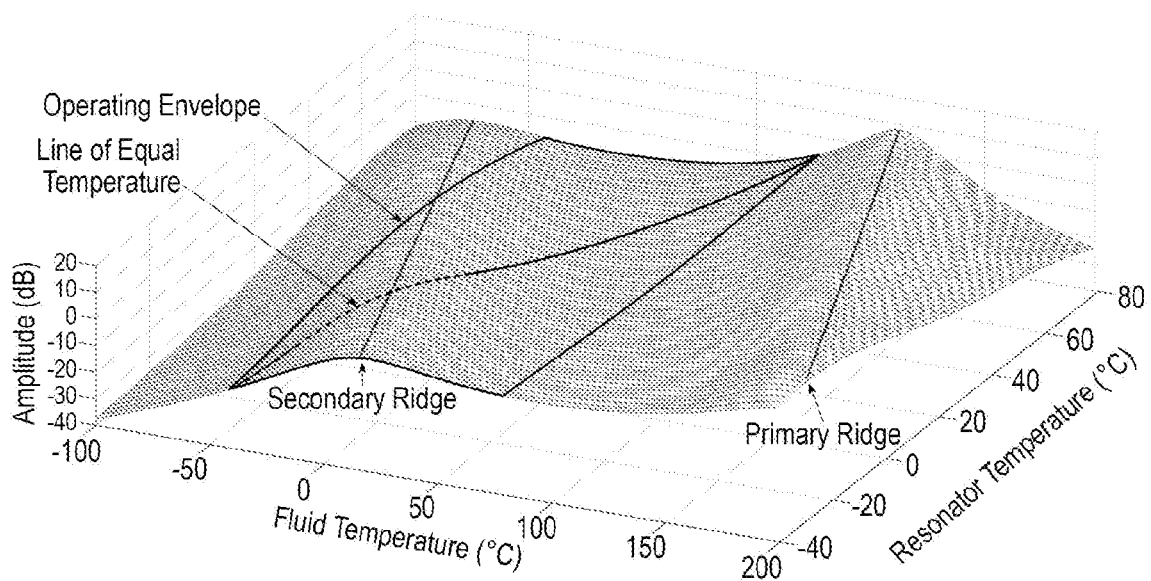
FIG. 6 shows the results of a computer simulation of the temperature dependence of the amplitude of a signal propagated between the two ports of the arrangement shown in FIG. 5.
Figure 7:
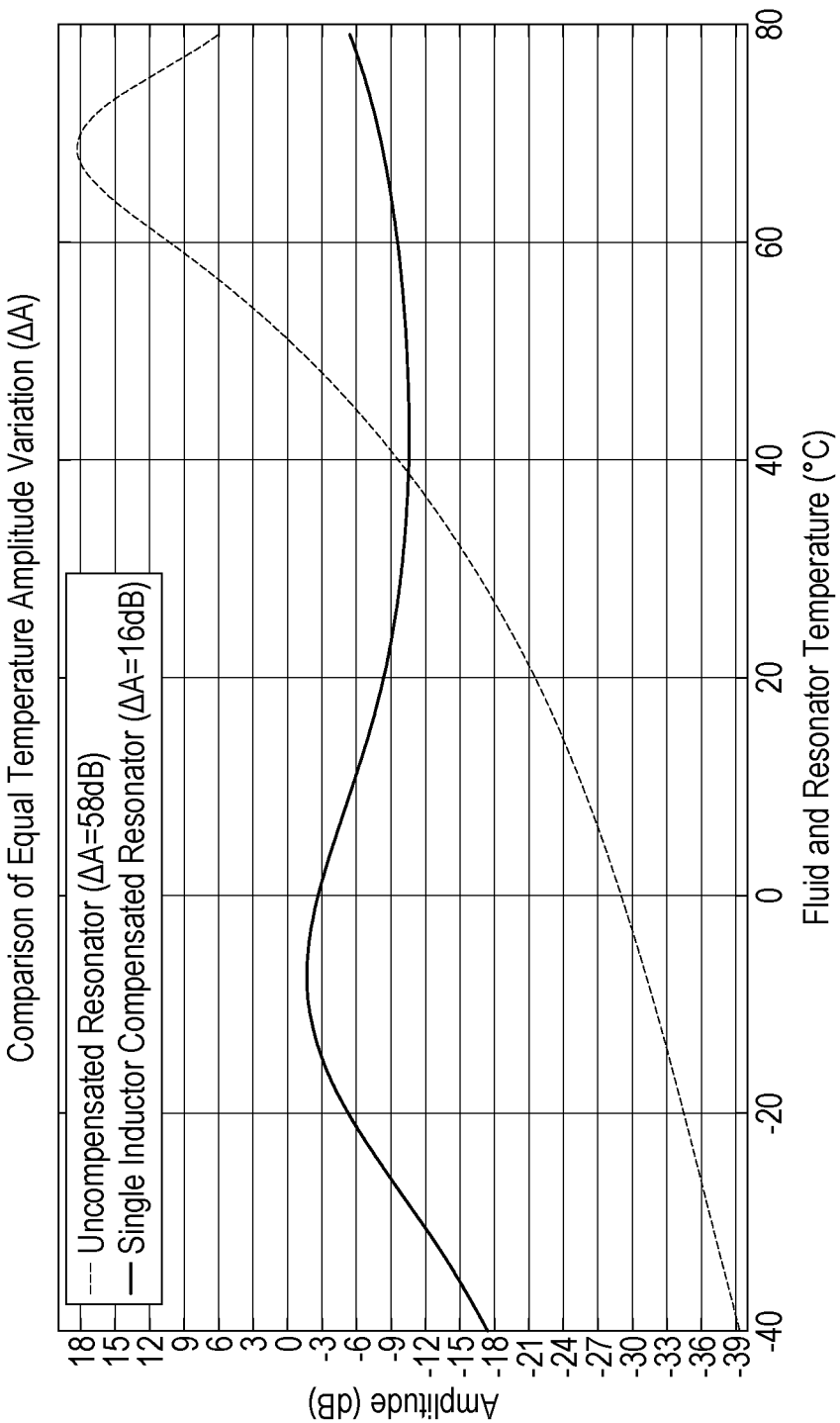
FIG. 7 shows a comparison of the graph of FIG. 4 with the graph of FIG. 6 along the respective lines of equal temperature.

FIG. 7 shows a comparison of the signal amplitudes along the equal temperature lines of FIG. 4 and FIG. 6 respectively. While the network shown in FIG. 5 achieves a flatter response the signal variation remains undesirably high.

Figure 8:
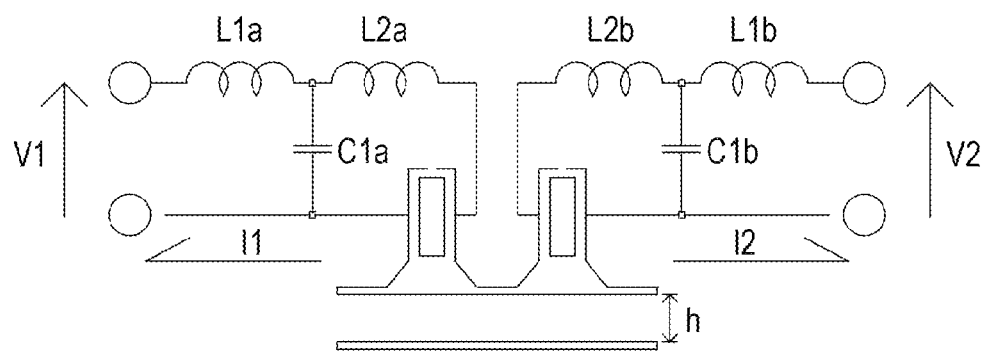
FIG. 8 shows another electrical representation of a way of connecting two transducers to input output ports.
Figure 9:
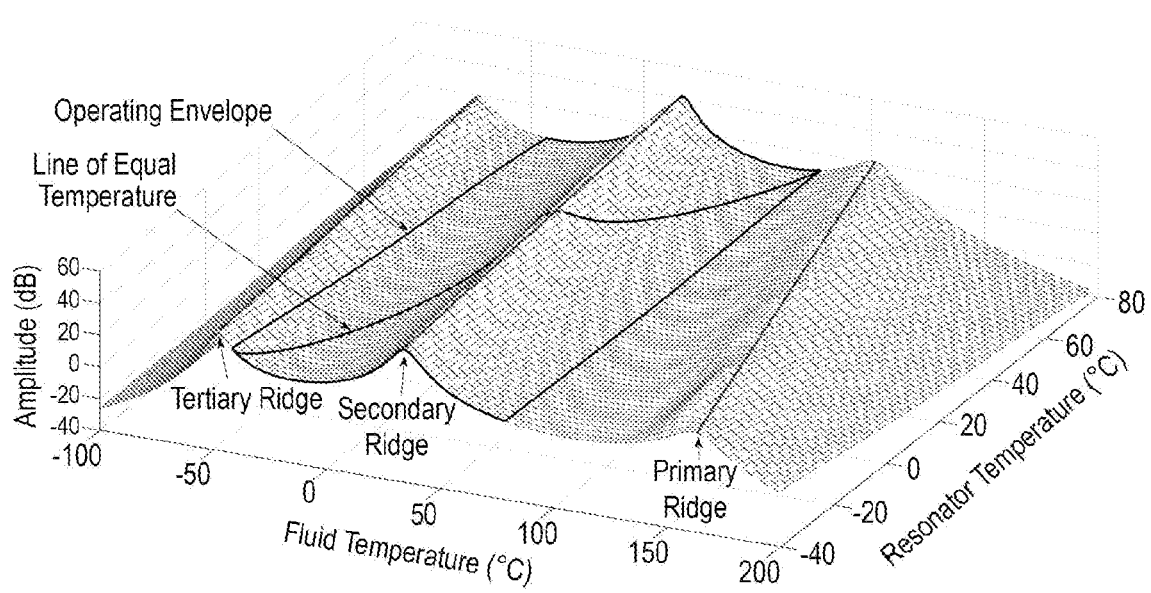
FIG. 9 shows the results of a computer simulation of the temperature dependence of the amplitude of a signal propagated between the two ports of the arrangement shown in FIG. 8.

FIG. 8 shows an alternative network in which a second inductor and a further capacitor have been added. FIG. 9 shows the transfer characteristics between the two ports of this device. As can be seen from FIG. 9 the addition of these additional components has changed the resonant behaviour of the network so that a third ridge is created. This broadens the range of fluid temperatures over which a strong signal can be expected.

FIG. 9 exhibits a flatter signal response compared to FIG. 3. However, the observable signal variation is undesirably large.

Figure 10:
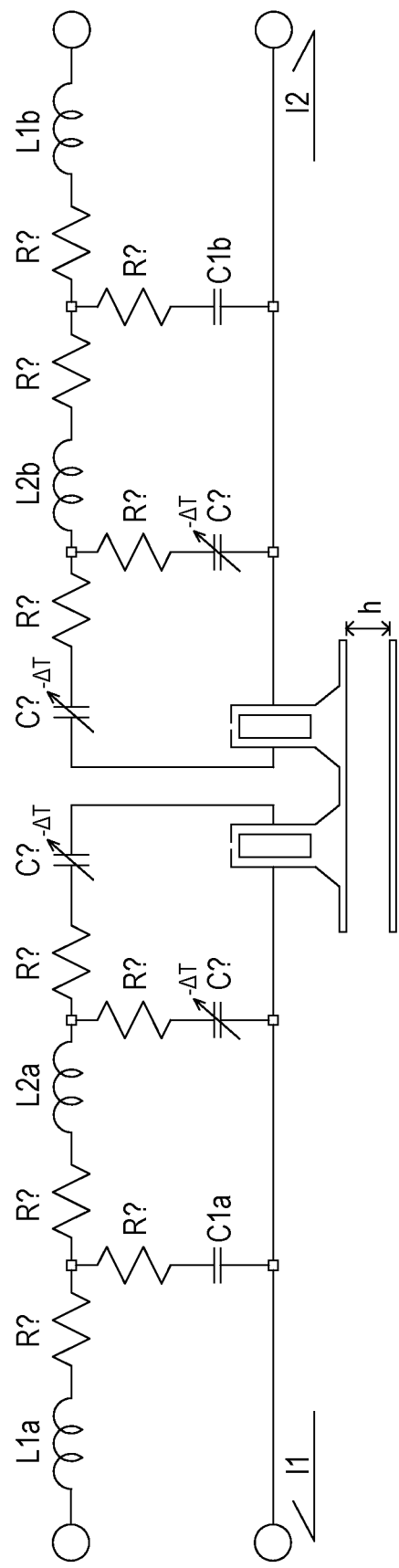
FIG. 10 shows a further, generalised electrical representation of a way of connecting two transducers to input output ports.

FIG. 10 shows a generalised version of a matching network that comprises the two inductors and one capacitor shown in FIG. 8 with additional damping resistors (the question marks next to the resistor letter R indicate that only some of these damping resistors may be present) and an additional capacitor with a temperature dependent capacitance (the question marks next to the letter C indicate that one or the other capacitor may be omitted).

Figure 11:
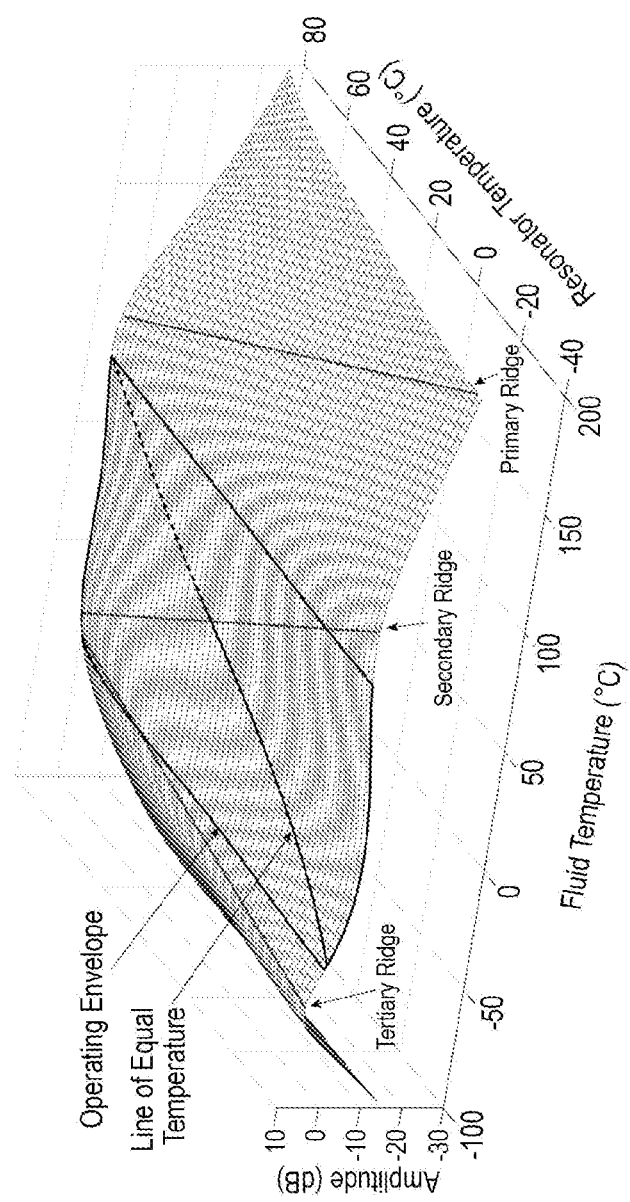
FIG. 11 shows the results of a computer simulation of the temperature dependence of the amplitude of a signal propagated between the two ports of the arrangement shown in FIG. 10 wherein no temperature compensating capacitances are used.

FIG. 11 shows the results of a simulation of this circuit with some of the damping resistors and neither of the temperature dependent capacitors present. As can be seen in FIG. 11, the flatness of the curve representing the signal amplitude within the operating envelope is improved dramatically from the addition of the damping resistors. These resistors dampen the large peaks observable along the ridges in FIG. 9.

Figure 12A:
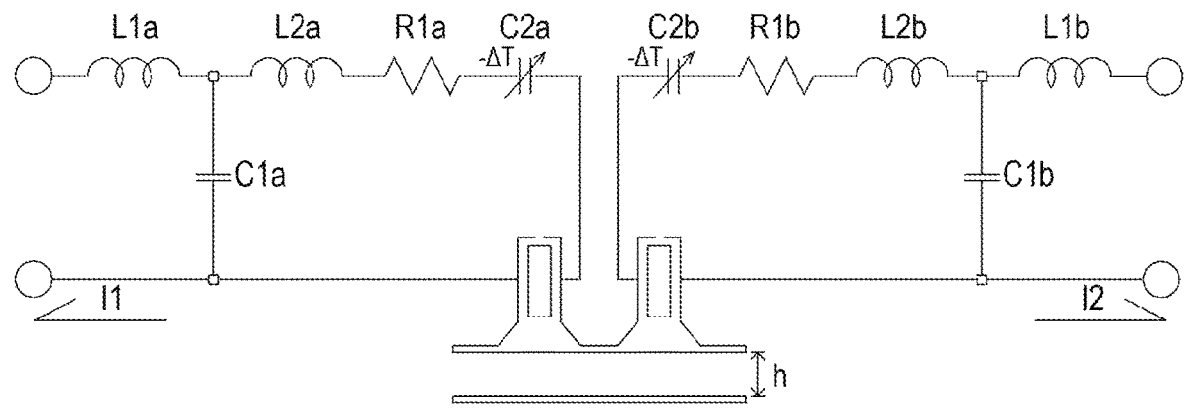
FIG. 12A shows a version of the circuit shown in FIG. 10, wherein components with zero value have been omitted.
Figure 12B:
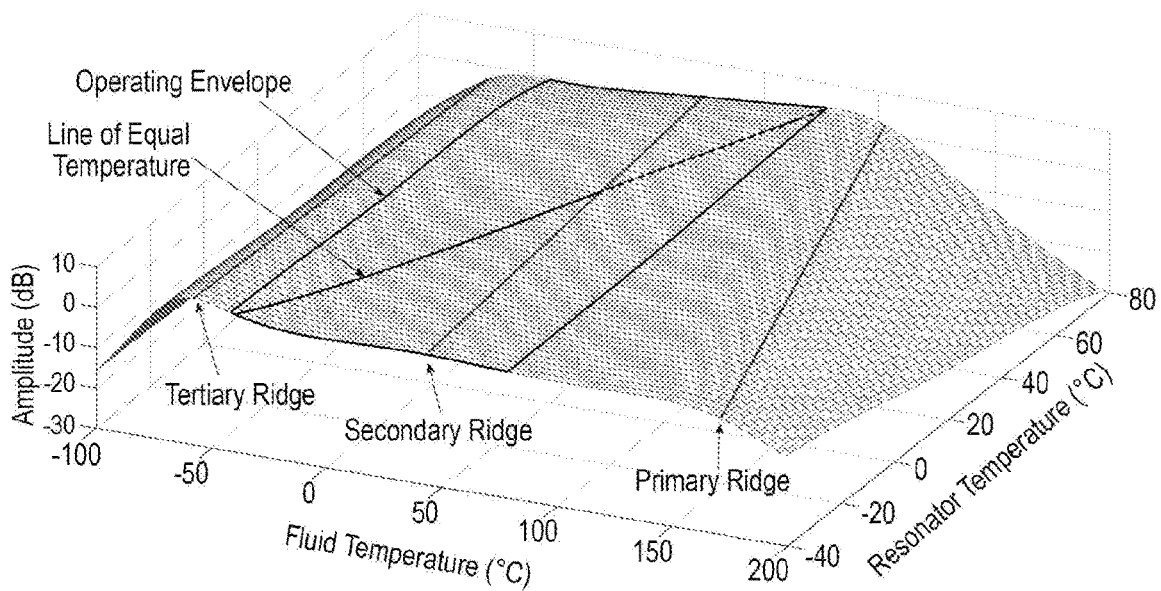
FIG. 12B shows the results of a computer simulation of the temperature dependence of the amplitude of a signal propagated between the two ports of the arrangement shown in FIG. 12A.
Figure 14A:
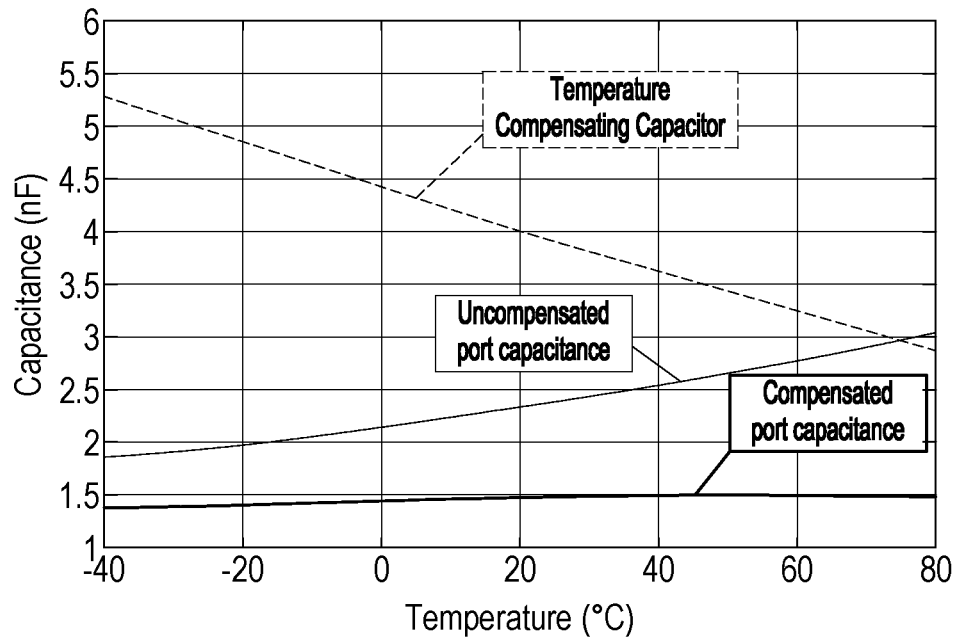
FIG. 14A shows the temperature dependence of the capacitance of the transducer, of a temperature compensating capacitor and of the combination of both in a configuration in which the temperature compensating capacitor is connected in series with the transducer.
Figure 14B:
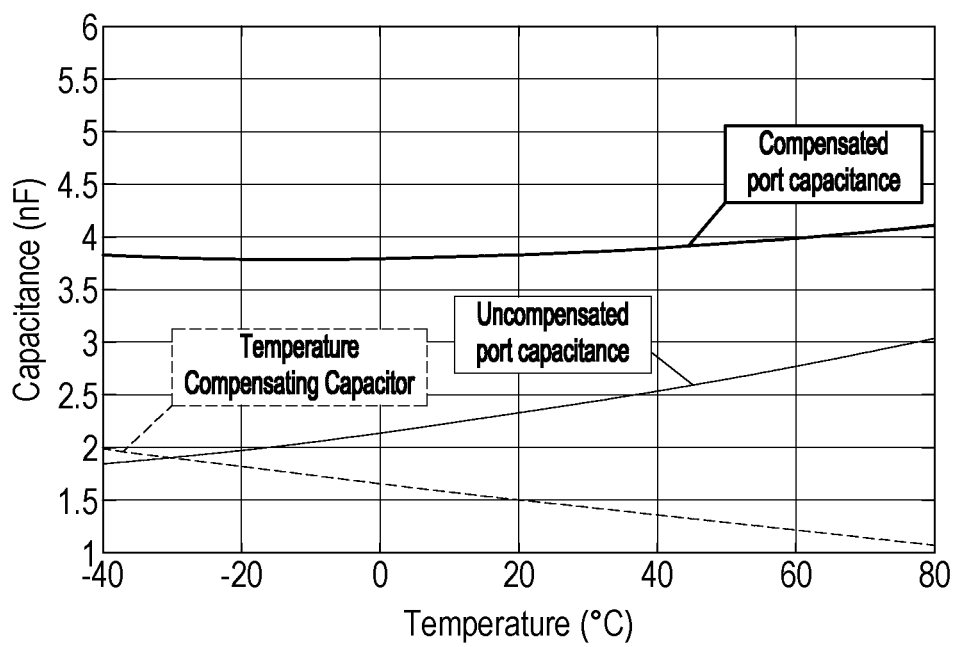
FIG. 14B shows the temperature dependence of the capacitance of the transducer, of a temperature compensating capacitor and of the combination of both in a configuration in which the temperature compensating capacitor is connected in parallel with the transducer.

FIG. 12A shows a version of the circuit shown in FIG. 10, wherein components with zero value have been omitted. FIG. 12B shows the results of a computer simulation of the temperature dependence of the amplitude of a signal propagated between the two ports of the arrangement shown in FIG. 12A for the following component values:

L1: $9.80 \times 10^{-4}$H
C1: $2.80 \times 10^{-8}$F
L2: $1.43 \times 10^{-2}$H
R1: $1.22 \times 10^{3}\Omega$
C2: $4.50 \times 10^{-9}$F The capacitance C2 is at 20° C. for a temperature compensating capacitor comprising a Murata ZLM Temperature Compensating Dielectric. The temperature dependence of the capacitance of C2 is also illustrated in FIG. 14B. The temperature dependence of the port capacitance of the transducer used for all simulations in the present disclosure is as indicated in FIGS. 14A and 14B. The two networks individually connecting the two ports to the transducers are symmetrical so that components that only differ in naming through the use of the letters a and b respectively have the same component values.

FIG. 12B shows that by using temperature dependent capacitors the flatness of the transfer function within the operating envelope is further improved. As can be seem from preceding figures, the first and second ridges do not extend parallel to the resonator temperature axis. The introduction of the temperature dependent capacitance changes/reduces the angle between the first ridge and the resonator temperature axis. The moving of the second ridge has reduced attenuation of the propagated signal for low resonator temperatures and higher fluid temperatures within the operating envelope.

Figure 13:
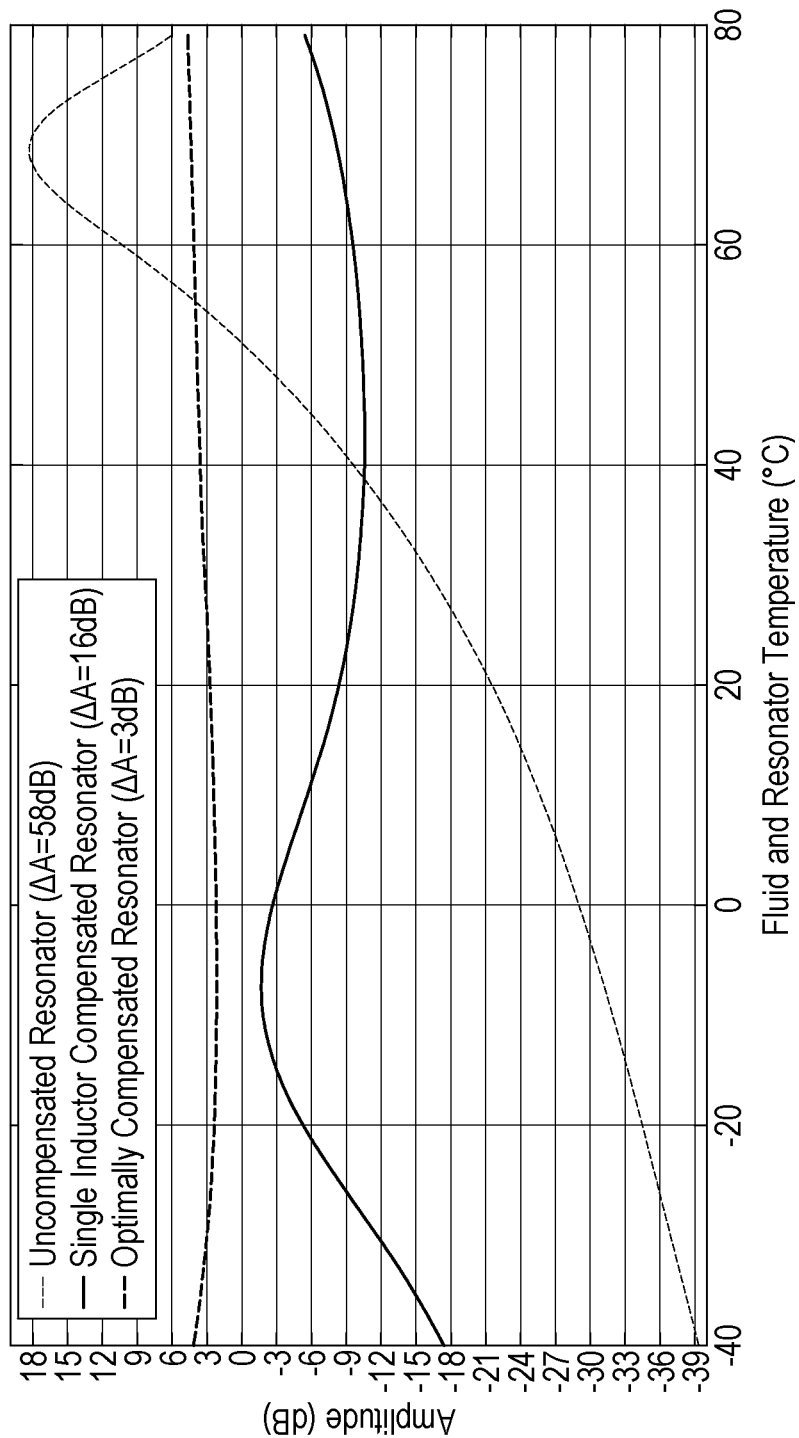
FIG. 13 shows a comparison of the graph of FIG. 4 and the graph of FIG. 6 with the graph of FIG. 12 along the respective lines of equal temperature.

FIG. 13 expands the comparison shown in FIG. 7 to include signal amplitude data along the line of equal temperature in FIG. 12B. The optimised circuit shown in FIG. 12A attains 3 dB signal flatness.

In the circuit shown in FIG. 12A the temperature dependent capacitance is connected in series with the transducer 5, with no capacitance being provided in parallel with the transducer. However, arrangements in which the temperature dependent capacitance is provided in parallel in the manner illustrated in FIG. 10 and not in series are also possible. FIG. 14A and FIG. 14B illustrate the temperature dependence of the port capacitance of the transducers 5 and that, using an appropriate temperature compensating capacitor, the temperature dependence of the combined capacitance can be reduced considerably.

As discussed above, the device shown in FIG. 1 detects a phase shift of a signal propagating from one terminal port to another. In still air, an identical phase shift is measured when the direction of signal transmission is reversed. If the air moves, on the other hand a difference in phase shift is detected when reversing the direction of propagation of the signal through the device.

It will be appreciated from the above, the device will operate most accurately if the phase shift measured in still air does not change when the signal propagating between port-pairs reverses direction. This means that the electromechanical network including the transducers and compensation network is reciprocal and that the signal source and load (receiver) have substantially identical impedance.

In one embodiment the signal sources injecting signals into the ports of the matching networks have a low-impedance, approximating ideal voltage sources. In this embodiment the load across which the received signals are measure have equally low-impedance, ideally close to a short circuit. In this embodiment it is preferable for the compensation network topology to include a reactance in series with the input port, as a shunt reactance would simply be short circuited by the low impedance of the signal source or output load. An embodiment of this nature can, for example, include a voltage source injecting signals in the port of the currently transmitting branch of the device and a current or transimpedance amplifier for detecting a signal current at the ports of the currently receiving branch of the device.

In another embodiment the signal sources injecting signals into the ports of the matching networks have a high-impedance, approximating ideal current sources. In this embodiment the load across which the received signals are measure have equally high impedance, ideally close to an open circuit. In this embodiment it is preferable for the compensation network topology to include a reactance in parallel with the input port. An embodiment of this nature can, for example, include a current source injecting signals in the port of the currently transmitting branch of the device and a voltage or transconductance amplifier for detecting a signal voltage at the ports of the currently receiving branch of the device.

While in the above described embodiments inductors and capacitors are provided in T-network configurations with two inductors along the horizontal branches of this configuration and a capacitor on the vertical part of the network in an alternative embodiment the network could be a π-network with two inductances provided along the vertical branches of the π-network and a capacitance provided along the horizontal branch. An alternative way of addressing the low sensitivity of the transducers 5 could be to provide a tracking amplifier that simply increases its gain when a drop in detected signal strength occurs. Such tracking would be based on the assumption that, if the frequency used for creating the standing wave within the resonance cavity is correctly chosen then a reduction in detected signal would be caused by the transducers 5 operating with reduced sensitivity. Such tracking may perform well in a number of situations. However, in situations where rapid changes in temperature occur any such tracking function would introduce hysteresis during which the received signal is not adequately amplified and during which the received signal may not be suitable for processing. Such situations may, for example, occur in cold environments in which the sensor shown in FIG. 1 is heated to protect it from the formation of ice. If little fluid flows through the sensor the temperature in the resonant cavity increases despite the colder ambient conditions. As a result the transducers are excited to operate at a frequency at which they may have a high sensitivity. A sudden increase in the fluid flow speed in this situation, however, leads to a sudden drop in the fluid temperature within the resonant cavity. To account for this change the device adjust the frequency with which the transducers create the standing wave, causing the transducers to operate in a part of their operating range in which they have reduced sensitivity. At the same time the tracking amplifier attempts to increase its amplification to accommodate the reduction in sensitivity. It will be appreciated that such attempts at correcting the measurement conditions take time. The embodiments described above remove the need for an amplifier to actively seek an amplification factor that compensates for a reduction in the sensitivity of the transducers. Consequently fluid flow speed measurement devices according to the invention can adapt to changes in the temperature of fluid within the resonant cavity rapidly.

While the above description of preferred embodiments has focussed on resonant networks that comprise LC elements connected to the transducers 5 in a low pass configuration it is highlighted that it is not essential that such a configuration is used. Instead the LC elements can be provided in a high pass configuration in which capacitors are provided in place of the inductors and vice versa.

While certain arrangements have been described, the arrangements have been presented by way of example only, and are not intended to limit the scope of the inventions. Indeed, the novel methods and devices described herein may be embodied in a variety of other forms; furthermore, various omissions, substitutions and changes in the form of the methods and systems described herein may be made.

The invention claimed is:

1. A device comprising:
   an acoustic resonance cavity through which a fluid can flow, the fluid having a fluid temperature within an operating temperature range, the acoustic resonance cavity capable of supporting an acoustic standing wave, wherein the frequency of the acoustic standing wave varies with the fluid temperature over the operating temperature range, thereby defining an operating frequency range;
   at least two acoustic transducers, respectively for generating and detecting the acoustic standing wave, wherein a frequency response of said at least two acoustic transducers varies over said operating frequency range;
   connected to each transducer of the at least two acoustic transducers an electric network comprising at least one inductive component and at least one capacitive component;
   wherein the at least one inductive component and the at least one capacitive component define, together with the connected transducer of the at least two acoustic transducers, a resonance behaviour in which signals in a part of the operating frequency range in which the connected transducer of the at least two acoustic transducers has a first sensitivity are preferentially amplified relative to signals in a part of the operating frequency range in which the connected transducer of the at least two acoustic transducers has a second sensitivity, wherein the first sensitivity is lower than the second sensitivity, so that variations in the amplitude of signals propagated through the acoustic resonance cavity, the at least two acoustic transducers and the connected electric networks across the operating frequency range are less than variations in amplitude of a signal propagated through only the acoustic resonance cavity and the at least two acoustic transducers.

2. A device as claimed in claim 1, wherein the electric network comprises a further reactive component selected from an inductor and a capacitor.

3. A device as claimed in claim 2, wherein the at least one inductive component, the at least one capacitive component and the further reactive component are arranged in a T-network wherein reactive components of the same type are provided along two horizontal parts of the network or in a π-network wherein reactive components of the same type are provided along two vertical parts of the network.

4. A device as claimed in claim 1, further comprising a capacitor with a capacitance that varies with capacitor temperature of the capacitor and provided in parallel or in series with a port capacitance of the connected transducer of the at least two acoustic transducers, the capacitor having a temperature dependence that causes the combination of the capacitor with the connected transducer of the at least two acoustic transducers to have a reduced or substantially eliminated temperature dependence over the operating temperature range than the connected transducer alone.

5. A device as claimed in claim 1, further comprising one or more damping means configured to reduce signal amplification at one or more resonance frequencies of the electric network.

6. (Currently Amended A device as claimed in claim 1, wherein the variation in frequency response across the operating frequency range of the combination of the electric network and the connected transducer of the at least two acoustic transducers is less than 18 dB.

7. A device as claimed in claim 6, wherein the variation in frequency response across the operating frequency range of the combination of the electric network and the connected transducer of the at least two acoustic transducers is less than 10 dB.

8. A device as claimed in claim 7, wherein the variation in frequency response across the operating frequency range of the combination of the electric network and the connected transducer of the at least two acoustic transducers is less than 3 dB.

9. A method of measuring fluid flow speed comprising:
a) providing a device comprising:
   an acoustic resonance cavity through which a fluid can flow, the fluid having a fluid temperature within an operating temperature range, the acoustic resonance cavity capable of supporting an acoustic standing wave, wherein the frequency of the acoustic standing wave varies with the fluid temperature over the operating temperature range, thereby defining an operating frequency range;
   at least two acoustic transducers, respectively for generating and detecting the acoustic standing wave, wherein a frequency response of said at least two acoustic transducers varies over said operating frequency range;
   connected to each transducer of the at least two acoustic transducers an electric network of at least two electric networks, each electric network of the at least two electric networks comprising at least one inductive component and at least one capacitive component;
wherein the at least one inductive component and the at least one capacitive component define, together with the connected transducer of the at least two acoustic transducers, a resonance behaviour in which signals in a part of the operating frequency range in which the connected transducer of the at least two acoustic transducers has a first sensitivity are preferentially amplified relative to signals in a part of the operating frequency range in which the connected transducer of the at least two acoustic transducers has a second sensitivity, wherein the first sensitivity is lower than the second sensitivity, so that variations in the amplitude of signals propagated through the acoustic resonance cavity, the at least two acoustic transducers and the connected electric networks across the operating frequency range are less than variations in amplitude of a signal propagated through only the acoustic resonance cavity and the at least two acoustic transducers;
b) injecting a signal into an input port of the electric network of the at least two electric networks coupled to one of the transducers of the at least two acoustic transducers at a frequency at which a standing wave is created in the cavity;
c) receiving the injected signal at an output port of the other one of the at least two transducers after the injected signal has propagated through all of the electric networks of the at least two electric networks connected to the at least two transducers, the at least two transducers and the acoustic resonance cavity;
d) comparing the injected signal with the received signal to determine a first time delay and/or phase shift experienced during propagation of the injected signal;
e) repeating steps b) and c) after swapping the electric networks of the at least two electric networks and the connected transducers of the at least two acoustic transducers respectively used for transmission and reception,
f) comparing the injected signal with the received signal to determine a second time delay and/or phase shift experienced during propagation of the injected signal;
g) determining a flow speed of fluid in the acoustic resonance cavity based on determined first and second time delays and/or phase shifts.

\* \* \* \* \*

UNITED STATES PATENT AND TRADEMARK OFFICE
CERTIFICATE OF CORRECTION

PATENT NO. : 10,634,533 B2  
APPLICATION NO. : 16/153590  
DATED : April 28, 2020  
INVENTOR(S) : Michael Kincel Page 1 of 1

It is certified that error appears in the above-identified patent and that said Letters Patent is hereby corrected as shown below:

Claim 6, Column 11, Line 30:  
"(Currently Amended A device as claimed in claim 1,"  
Should read:  
-- A device as claimed in claim 1, --

Signed and Sealed this  
Eighth Day of September, 2020

Andrei Iancu  
*Director of the United States Patent and Trademark Office*